July 21, 1936.          G. FASSIN          2,048,440
MICROSCOPE
Filed Nov. 27, 1933
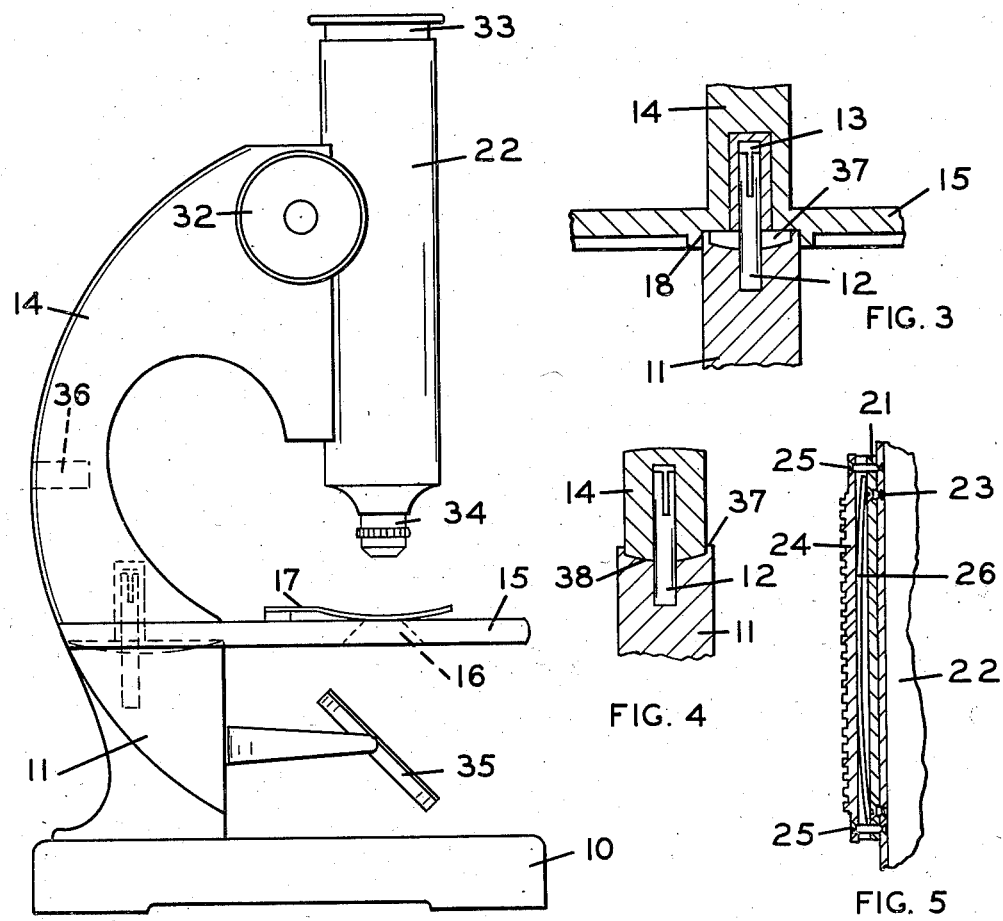
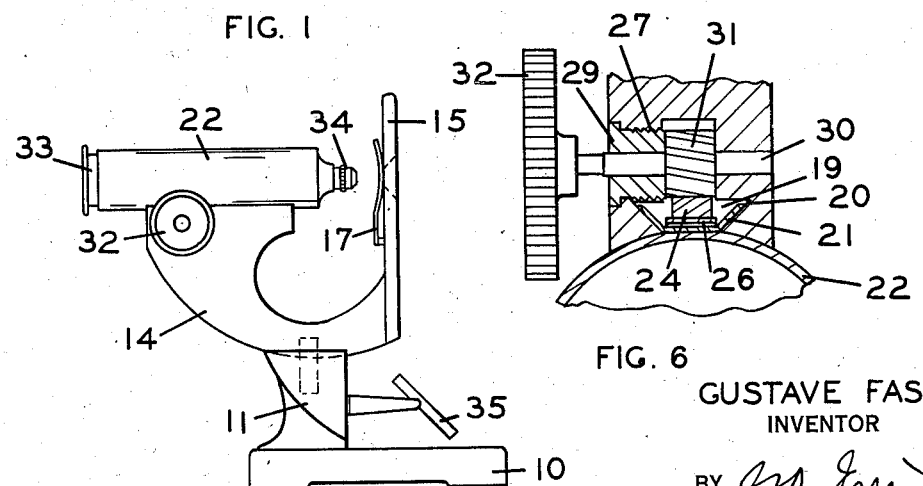
GUSTAVE FASSIN
INVENTOR
BY J.A. Ellestad
ATTORNEY Patented July 21, 1936

2,048,440

UNITED STATES PATENT OFFICE 2,048,440

MICROSCOPE

Gustave Fassin, Irondequoit, N. Y., assignor to Bausch & Lomb Optical Company, Rochester, N. Y., a corporation of New York Application November 27, 1933, Serial No. 699,849

8 Claims. (Cl. 88—39)

This invention relates to microscopes and has for one of its objects the provision of a relatively simple form of compound microscope which will be efficient in operation and capable of being manufactured readily and cheaply. Another object is to provide an improved means for effecting adjustment of the lens tube. A further object is to provide a microscope having an arm and lens tube which can be selectively arranged in a vertical or horizontal position without employing an inclination joint. These and other objects and advantages reside in certain novel features of construction, arrangement and combination of parts as will hereinafter be more fully described and pointed out in the appended claims.

Referring to the drawing:

Fig. 1 is a side elevation of a microscope embodying my invention.

Fig. 2 is a similar view with the arm and lens tube in horizontal position.

Fig. 3 is a fragmentary sectional view showing the method of supporting the arm and lens tube as in Fig. 1.

Fig. 4 is a similar view showing the method of supporting the arm and lens tube in the position of Fig. 2.

Fig. 5 is a fragmentary sectional view showing the manner of mounting the rack.

Fig. 6 is a sectional view showing the rack and pinion structure.

A preferred embodiment of my invention is illustrated in the drawing wherein 10 indicates a base portion having an integral vertical member or column 11 which carries an upstanding pin 12 which fits into an opening 13 on the under side of arm 14. Preferably formed integral with arm 14 is a stage 15 having the usual central opening 16 and the spring clips 17 for holding an object slide in position. The under side of arm 14 has a recess 18 in which the top of column 11 is positioned, as shown in Fig. 3, so that relative lateral movement between the arm and column is prevented.

The face of the upper portion of arm 14 is provided with a dovetailed groove or slot 19 having the inclined undercut faces 20 against which bear the diverging faces of guide member 21 which is secured to lens tube 22 by screws 23. A rack 24 is yieldably mounted on lens tube 22 by means of screws 25 and a spring 26 which is positioned between the rack and the guide member 21. Adjacent to the groove 19 in the arm is an opening 27 and a smaller opening 28. Threaded into opening 27 is a bushing 29 which together with opening 28 provide bearings for the rotatable shaft 30 carrying the pinion 31 which cooperates with rack 24. Shaft 30 carries a hand knob 32 and the lens tube 22 carries a suitable ocular 33 and objective 34. A mirror 35 is adjustably mounted on the column 11 below stage 15.

When it is desired to place the lens tube in a horizontal position for purposes of photomicrography or projection, for example, the arm and stage are removed from pin 12 and the arm is positioned on top of column 11 with the pin 12 positioned in the hole 36 in arm 14 as shown on Fig. 2. In order to prevent lateral displacement, the top of column 11 is provided with a recess 37 having a curved bottom 38 so that the arm fits into the recess with curved part of the arm resting on the bottom of the recess.

From the foregoing it will be apparent that I am able to attain the objects of my invention and provide an improved microscope which will be relatively simple in structure yet efficient in operation. Since the rack is yieldably mounted the pinion is under tension and the spring 26 also urges the faces of guide member 21 against the faces 20 of the groove 19 so that the lens tube can be adjusted smoothly and without lost motion. The arm, stage and base can be made of any suitable material though I prefer to make them of a non-metallic plastic material which can be molded. Various modifications can obviously be made without departing from the spirit of my invention.

I claim:

1. A microscope comprising a base having a vertical member provided on its top side with a recess having a curved bottom, a curved arm member mounted on said vertical member, a lens tube carried by said arm member, a pin on one member, a cooperating opening in the other member, said arm member being detachably secured to said vertical member and adapted to be positioned in said recess with the curved portion of the arm contacting the curved bottom of the recess and with said pin engaging within said opening.

2. A microscope adapted for use in two positions comprising a base having a vertical member which is non-circular in horizontal section, a groove in the top face of said member, a pin extending upwardly from said member, an arm, a lens tube carried by said arm, said arm being of a cross section complemental to said groove and having an opening for receiving said pin, a second opening for receiving said pin in the under side of said arm and a recess of the same shape and size as said member surrounding said second opening to receive the upper end of said member and prevent relative rotation about said pin.

3. A microscope comprising an arm, a lens tube slidably mounted on said arm, a pinion rotatably mounted on said arm, a rack movably mounted on said lens tube, and yieldable means for urging said rack into operative relation with said pinion.

4. A microscope comprising an arm, a lens tube slidably mounted on the arm, said arm having a centrally disposed slot and an opening on each side thereof, a bushing threaded into one of said openings, a shaft rotatably mounted in said bushing and the other opening, and a pinion on said shaft engaging a rack on said lens tube whereby the latter may be adjusted.

5. A microscope comprising an arm, a lens tube slidably mounted on said arm, means for moving said tube, said means comprising a rack secured to said tube and a pinion engaging said rack, said pinion being mounted on a shaft, said arm being provided with an opening having an enlarged portion, a bushing threaded into said enlarged portion, said shaft being rotatably mounted on bearings provided by said bushing and opening.

6. A microscope comprising a base carrying an arm provided with a dove-tailed slot, a lens tube, a guide member secured to said tube, said member having outwardly extending divergent portions which fit slidably into said slot, a rack movably mounted on the central part of said guide member, a spring interposed between said rack and member and a pinion rotatably mounted on said arm for cooperation with said rack whereby said lens tube may be adjusted.

7. A microscope comprising a base, a standard mounted upon said base, an arm, a stage fixed to one end of said arm, cooperating pin and recess means on said base and on said arm for detachably fixing said arm and stage to said base, a dovetail groove at the other end of said arm perpendicular to said stage, a body tube slidably mounted on said arm having divergent flanges for engaging the angular walls of said groove, resilient means for urging said flanges into contact with said walls and means for adjusting said body tube.

8. A microscope comprising a base, a standard mounted upon said base, an arm, a stage fixed to one end of said arm, cooperating pin and recess means on said base and on said arm for detachably fixing said arm and stage to said base, a groove at the other end of said arm, a pinion in said groove extending transversely thereof, a body tube slidably mounted on said arm, a rack bar attached to said body tube and extending into said groove for engagement by said pinion and a spring located between said body tube and said rack.

GUSTAVE FASSIN.